(12) United States Patent
Tang

(10) Patent No.: US 11,109,126 B2
(45) Date of Patent: Aug. 31, 2021

(54) SPEAKER DEVICE AND TERMINAL

(71) Applicant: GUANGDONG OPPO MOBILE TELECOMMUNICATIONS CORP., LTD., Guangdong (CN)

(72) Inventor: Chunshu Tang, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

(21) Appl. No.: 16/694,589

(22) Filed: Nov. 25, 2019

(65) Prior Publication Data

US 2020/0092623 A1  Mar. 19, 2020

Related U.S. Application Data

(63) Continuation of application No. PCT/CN2018/091867, filed on Jun. 19, 2018.

(30) Foreign Application Priority Data

Jun. 30, 2017  (CN) .......................... 201710530801.2
Jun. 30, 2017  (CN) .......................... 201720789027.2

(51) Int. Cl.
  *H04R 1/02*  (2006.01)
  *H04M 1/03*  (2006.01)
  *H04R 9/06*  (2006.01)

(52) U.S. Cl.
  CPC ................ *H04R 1/02* (2013.01); *H04M 1/03* (2013.01); *H04R 9/06* (2013.01); *H04R 2400/11* (2013.01)

(58) Field of Classification Search
  CPC ........ H04R 1/02; H04R 1/023; H04R 1/2826; H04R 1/2849; H04R 9/06; H04R 2400/11; H04M 1/03
  See application file for complete search history.

(56) References Cited

U.S. PATENT DOCUMENTS

| 2001/0041245 | A1  | 11/2001 | Funakoshi |
| 2009/0180648 | A1  | 7/2009  | Endo |
| 2009/0247244 | A1* | 10/2009 | Mittleman ............ H04M 1/035 455/575.1 |

(Continued)

FOREIGN PATENT DOCUMENTS

| CN | 202435573 U | 9/2012 |
| CN | 202799030 U | 3/2013 |

(Continued)

OTHER PUBLICATIONS

International search report issued in corresponding international application No. PCT/CN2018/091867 dated Aug. 9, 2018.

(Continued)

*Primary Examiner* — Tuan D Nguyen
(74) *Attorney, Agent, or Firm* — Young Basile Hanlon & MacFarlane, P.C.

(57) ABSTRACT

A speaker device is provided. The speaker device includes a casing and an acoustic driver disposed in the casing. The casing defines a sound output port for outputting sound, and the sound output port of the casing is partially covered, enabling a reduction in an airflow velocity in the sound output port. A terminal including the speaker device is also provided.

20 Claims, 6 Drawing Sheets

(56) References Cited

U.S. PATENT DOCUMENTS

| | | | |
|---|---|---|---|
| 2014/0152890 A1* | 6/2014 | Rayner | H04N 5/2252 348/376 |
| 2014/0233752 A1 | 8/2014 | Seo et al. | |
| 2017/0078777 A1 | 3/2017 | Mittleman et al. | |
| 2017/0126856 A1* | 5/2017 | Fujita | H04M 1/0202 |

FOREIGN PATENT DOCUMENTS

| | | |
|---|---|---|
| CN | 203301682 U | 11/2013 |
| CN | 203984670 U | 12/2014 |
| CN | 205726426 U | 11/2016 |
| CN | 205901991 U | 1/2017 |
| CN | 206042353 U | 3/2017 |
| KR | 20160016693 A | 2/2016 |

OTHER PUBLICATIONS

The extended European search report issued in corresponding European application No. 18824920.5 dated Feb. 5, 2020.
Examination report issued in corresponding European application No. 18824920.5 dated Aug. 19, 2020.
The first OA with English Translation issued in corresponding CN application No. 201710530801.2 dated May 5, 2019.
The third OA with English Translation issued in corresponding CN application No. 201710530801.2 dated Dec. 10, 2019.
The fourth OA with English Translation issued in corresponding CN application No. 201710530801.2 dated Mar. 12, 2020.
The second OA with English Translation issued in corresponding CN application No. 201710530801.2 dated Sep. 11, 2019.
Examination report issued in corresponding European application No. 18824920.5 dated Feb. 25, 2021.
First Examination Report issued in corresponding IN application No. 201917049074 dated Feb. 15, 2021.

* cited by examiner

SPEAKER DEVICE AND TERMINAL

CROSS-REFERENCE TO RELATED APPLICATION(S)

This application is a continuation of International Application No. PCT/CN2018/091867, filed on Jun. 19, 2018, which claims priorities to Chinese Patent Application No. 201720789027.2, filed on Jun. 30, 2017, and Chinese Patent Application No. 201710530801.2, filed on Jun. 30, 2017, the disclosures of all of which are hereby incorporated by reference in their entireties.

TECHNICAL FIELD

This disclosure relates to the field of electronic devices, and more particularly to a speaker device and a terminal.

BACKGROUND

With the development of science and technology, requirements on performances of portable products such as terminals are increasingly increased. The terminal's sound quality has an influence on its market competitiveness. In audio devices, a speaker is not valued, but for the sound quality, the speaker is an important component. When using the existing terminals, the inventor found that the sound quality of the terminals is not good, and sounds output via the speaker have a large distortion and many noises.

SUMMARY

According to a first aspect, a speaker device is provided. The speaker device includes a casing. The casing defines a sound output port for outputting sound, and the sound output port of the casing is partially covered, enabling a reduction in airflow velocity in the sound output port.

According to a second aspect, a terminal is provided. The terminal includes a speaker device. The speaker device includes a casing. The casing defines a sound output port for outputting sound, and the sound output port of the casing is partially covered, enabling a reduction in an airflow velocity in the sound output port.

According to a third aspect, a terminal is provided. The terminal includes a speaker device. The speaker device includes a casing defining a sound output port and an airflow cushion member. The airflow cushion member is disposed in the sound output port of the casing to partially cover the sound output port of the casing, enabling a reduction in an airflow velocity in the sound output port.

BRIEF DESCRIPTION OF DRAWINGS

In order to clearly describe technical solutions of implementations of the disclosure, the following will give a brief description of accompanying drawings used for describing the implementations of the disclosure. Apparently, the accompanying drawings described below merely illustrate some implementations of the disclosure. Those of ordinary skill in the art can also obtain other accompanying drawings based on the accompanying drawings described below without creative efforts.

DETAILED DESCRIPTION

Technical solutions embodied in implementations of the disclosure will be described in a clear and comprehensive manner in conjunction with the accompanying drawings. It is evident that the implementations described herein are merely some rather than all the implementations of the disclosure. All other implementations obtained by those of ordinary skill in the art based on the implementations of the disclosure without creative efforts shall fall within the protection scope of the disclosure.

Figure 1:
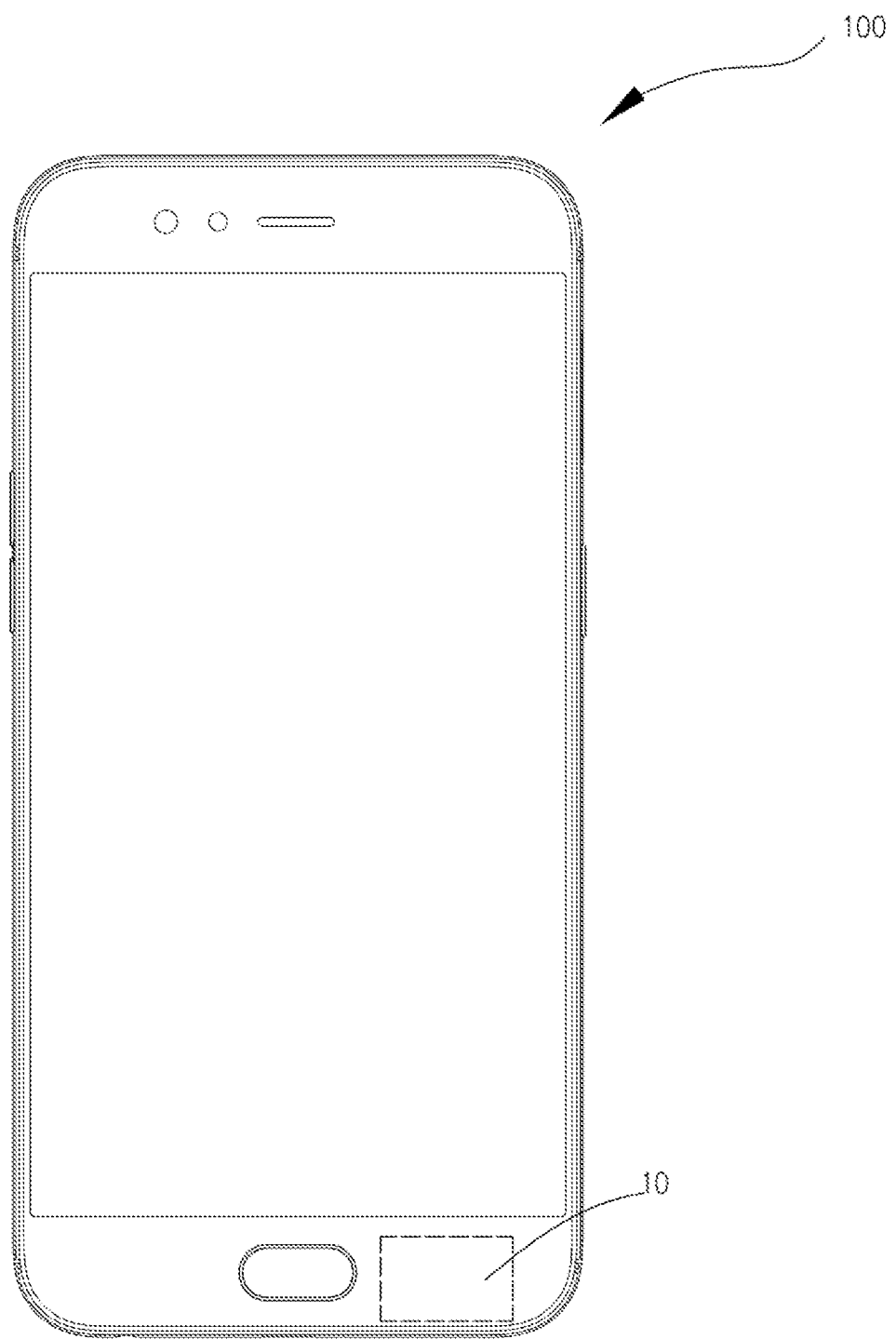
FIG. 1 is a schematic view illustrating a terminal according to at least one implementation.
Figure 2:
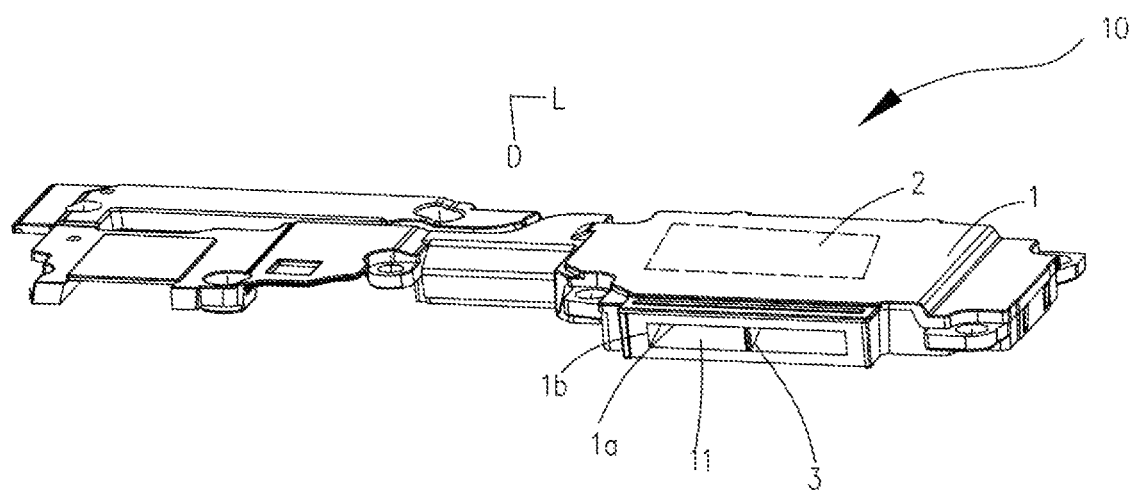
FIG. 2 is a schematic view illustrating a speaker device of the terminal in FIG. 1.

Referring to FIG. 1 and FIG. 2, a terminal 100 is provided according to at least one implementation. The terminal 100 includes a speaker device 10. The speaker device 10 includes a casing 1 and an acoustic driver 2 disposed in the casing 1. The casing 1 defines a sound output port 11 for outputting sound. The sound output port 11 of the casing 1 is partially covered, enabling a reduction in an airflow velocity in the sound output port 11.

As illustrated in FIG. 2, the casing 1 defines the sound output port 11. The acoustic driver 2 is fixed in the casing 1 and aligned with the sound output port 11, which facilitates sound to be output from the sound output port 11 of the casing 1. The sound output port 11 is rectangular. The sound output port 11 has two opposite first edges 1a parallel to a bottom of the casing 1, and two opposite second edges 1b. Each of the two second edges 1b is connected between the first edges 1a. A distance between the two first edges 1a is defined as a width D of the sound output port 11, and a distance between the two second edges 1b is defined as a length L of the sound output port 11. In at least one implementation, the distance between the two first edges 1a is shorter than that between the two second edges 1b, that is, the width D is less than the length L.

As illustrated in FIG. 2, the sound output port 11 is partially covered. The airflow velocity in the sound output port 11 of the speaker device 10 is relatively high. By partially covering the sound output port 11, the airflow velocity in the sound output port 11 of the casing 1 is reduced, and sound distortion and doping noise are improved, such that the speaker device 10 and the terminal 100 with good sound quality may be provided.

Figure 3:
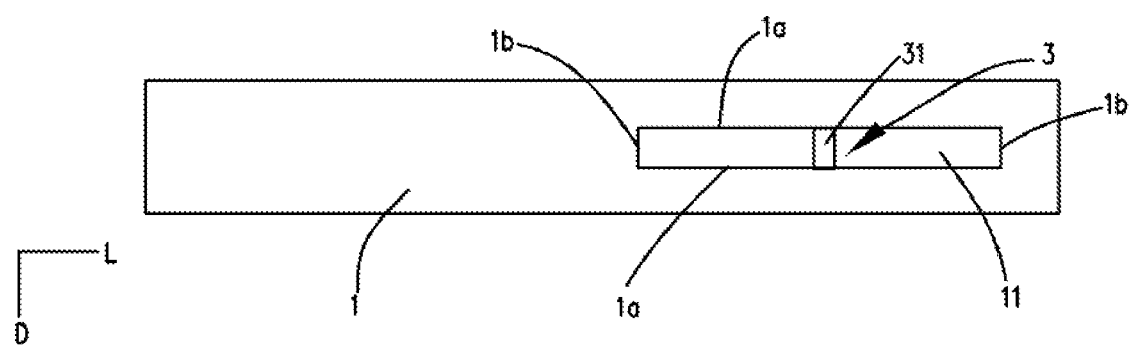
FIG. 3 is another schematic view illustrating a speaker device of the terminal in FIG. 1.

It will be appreciated that as illustrated in FIG. 3, the speaker device 10 further includes an airflow cushion member 3. The airflow cushion member 3 is disposed in the sound output port 11 of the casing 1, to partially cover the sound output port 11 of the casing 1.

Figure 4:
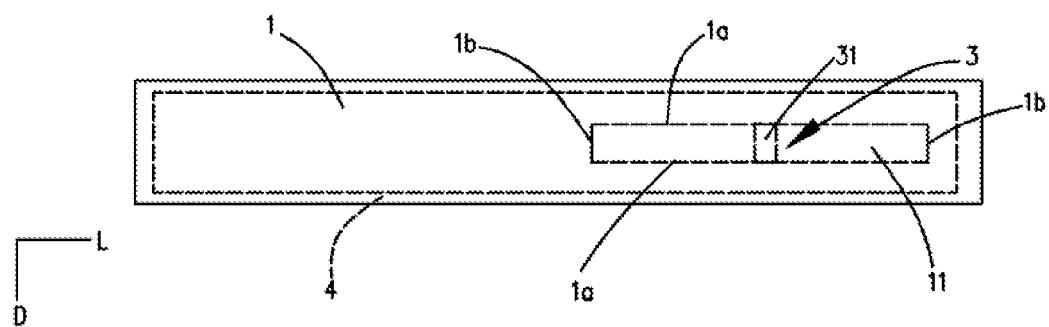
FIG. 4 is another schematic view illustrating a speaker device of the terminal in FIG.

To make a further improvement, as illustrated in FIG. 3 and FIG. 4, the airflow cushion member 3 is disposed in a middle area of the sound output port 11 along an extension direction of the two first edge 1a of the sound output port 11.

Figure 5:
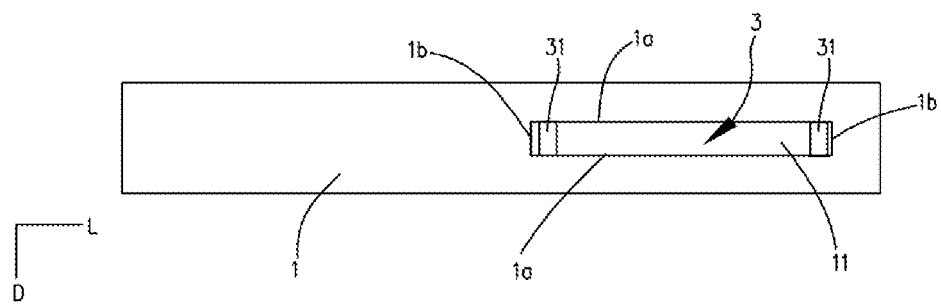
FIG. 5 is yet another schematic view illustrating a speaker device of the terminal in FIG. 1.
Figure 6:
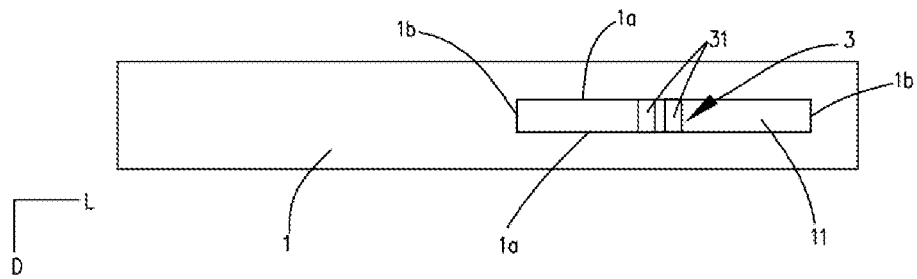
FIG. 6 is another schematic view illustrating a speaker device of the terminal in FIG. 1.

From large amount of experimental data, applicant have known that an airflow velocity in the middle area of the sound output port 11 is highest, and thus distortion of audio and generation of noise can be minimized by disposing the airflow cushion member 3 in the middle area. In at least one implementation, as illustrated in FIG. 5, the airflow cushion member 3 may also be disposed at a side of the middle area of the sound output port 11.

In at least one implementation, as illustrated in FIG. 3, the airflow cushion member 3 and the casing 1 are integrally formed. That is, the airflow cushion member 3 is directly formed in the middle area of the sound output port 11 of the casing 1 in the process of forming the casing 1, which facilitates installation of the speaker device 10.

In at least one implementation, as illustrated in FIG. 4, the airflow cushion member 3 is detachably coupled to the sound output port 11 of the casing 1. As one example, the airflow cushion member 3 is formed with another component. When the another component is coupled with the casing 1, the airflow cushion member 3 formed with the another component is aligned with the middle area of the sound output port 11, such that the airflow cushion member 3 is detachably coupled to the sound output port 11 of the casing 1. In this case, the airflow cushion member 3 can be inserted in and coupled to the sound output port 11, or the airflow cushion member 3 can abut against edges of the sound output port 11, so that the sound output port 11 is partially covered. It is to be noted that the speaker device 10 further includes a housing 4, that is, the another component described above is the housing 4 coupled with the casing 1. In at least one implementation, the housing 4 may be a front shell or a middle frame of the terminal 100. In at least one implementation, the housing 4 is provided with the airflow cushion member 3 at a position directly facing the sound output port 11, such that the airflow cushion member 3 is inserted in and coupled to the sound output port 11 of the casing 1 when the housing 4 is attached to the casing 1. In this way, the sound output port 11 is partially covered, enabling the reduction in an airflow velocity in the sound output port 11 of the casing 1 and improvement of the sound distortion and doping noise, such that a speaker device 10 with good sound quality can be provided.

Figure 7:
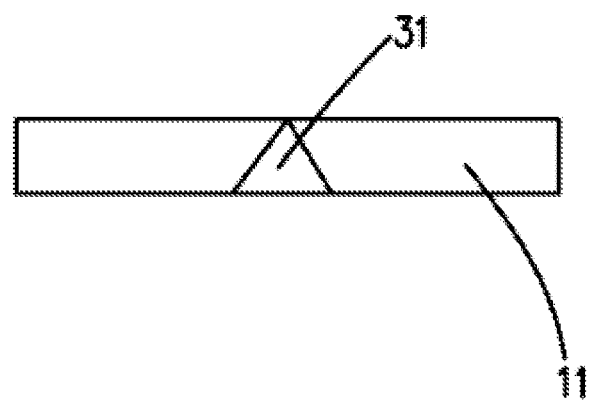
FIG. 7 to FIG. 9 are schematic structural views illustrating different airflow cushion members that can be applied to the speaker device of the terminal in FIG. 1.
Figure 8:
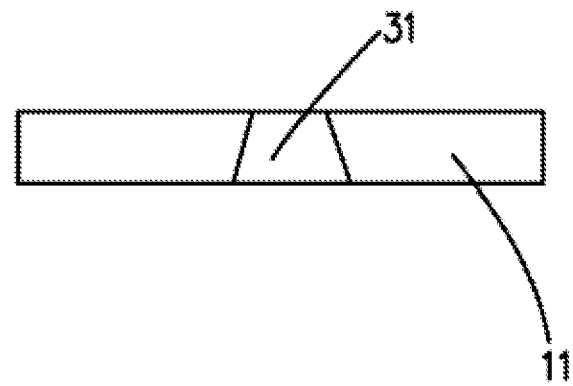
Figure 9:
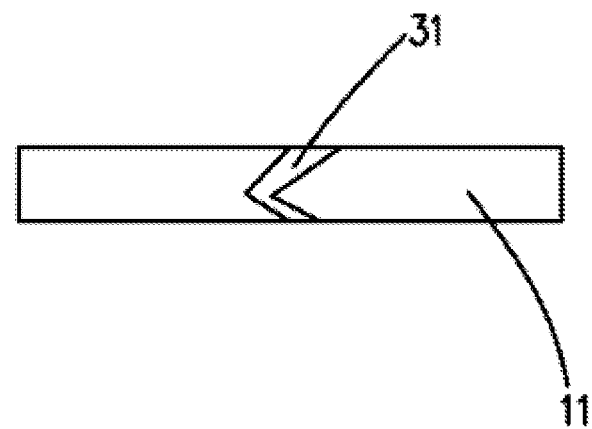

It is to be noted that as illustrated in FIG. 3 and FIG. 4, the airflow cushion member 3 includes at least one strip-shaped rib 31, and the at least one strip-shaped rib 31 is bridged to the two first edges 1a. In at least one implementation, the at least one strip-shaped rib 31 is embodied as one strip-shaped rib 31, which can cover the middle area of the sound output port 11. For example, as illustrated in FIG. 3, if the airflow cushion member 3 is directly formed with the casing 1, what needs to do is to form the strip-shaped rib 31 in the middle area of the sound output port 11 during forming the casing 1. For another example, as illustrated in FIG. 4, if the airflow cushion member 3 is inserted in and coupled to the sound output port 11, the strip-shaped rib 31 protrudes from a position of the housing 4 aligned with the middle area of the sound output port 11. With such configuration, it is possible to make the strip-shaped rib 31 on the housing 4 be aligned with the middle area of the sound output port 11 when the housing 4 is coupled with the casing 1, such that the strip-shaped rib 31 can be cross-connected to the two first edges 1a of the sound output port 11. As such, the sound output port 11 may be partially covered, thereby losing the airflow velocity in the sound output port 11 of the casing 1 and improving sound distortion and doping noise, so as to provide a speaker device 10 with good sound quality. As another example, the at least one strip-shaped rib 31 is embodied as two or three strip-shaped ribs 31. Multiple strip-shaped ribs 31 are centrally disposed in the middle area of the sound output port 11, and adjacent strip-shaped ribs 31 are spaced apart from each other. In other examples, the at least one strip-shaped rib 31 can be in a triangle shape as illustrated in FIG. 7, in a trapezoid shape as illustrated in FIG. 8, or in a lightning-like shape as illustrated in FIG. 9.

Figure 10:
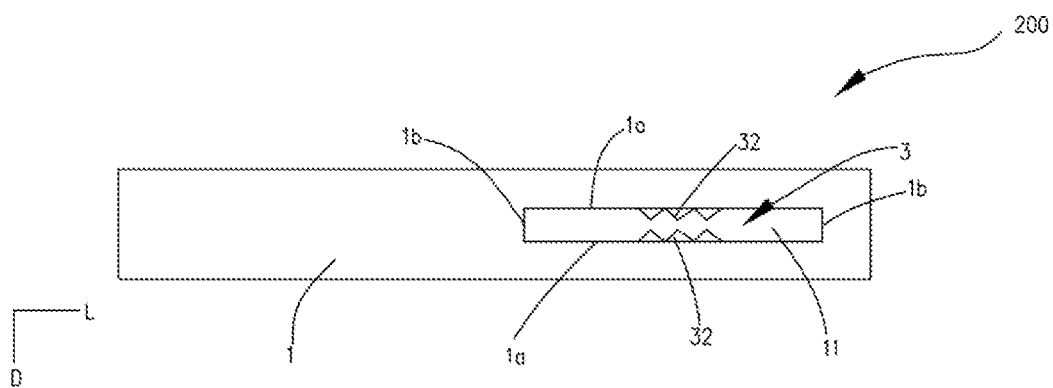
FIG. 10 is a schematic view illustrating a terminal according to at least one implementation.

FIG. 10 is a schematic view illustrating a terminal 200 according to at least one implementation. The terminal 200 is substantially the same as the terminal 100 of the first implementation, with the exception that the airflow cushion member 3 includes at least one serration portion 32. In at least one implementation, the at least one serration portion 32 is formed on both of the two first edges 1a or formed on one of the two first edges 1a of the sound output port 11.

As illustrated in FIG. 10, an edge of each of the two first edges 1a of the sound output port 11 is provided with one serration portion 32. The serration portion 32 has different lengths L in the width D direction of the sound output port 11, and thus the airflow velocity can be further decreased, thereby improving the sound quality of the audio.

Figure 11:
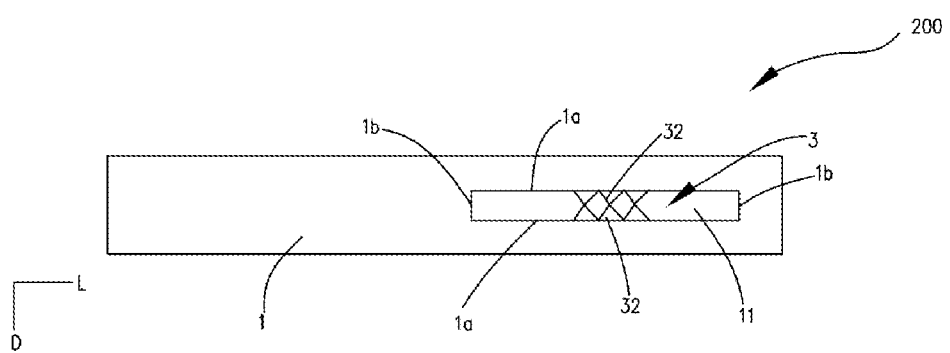
FIG. 11 is another schematic view illustrating a speaker device of the terminal in FIG. 10.

It should be noted that one of the two serration portions 32 is formed on one of the two first edges 1a of the sound output port 11, the other of the two serration portions 32 is formed on the other of the two first edges 1a of the sound output port 11, and the two serration portions 32 face each other and are spaced apart from each other. In this case, a gap between the middle area of the sound output port 11 and the two serration portions 32 can still allow the airflow to go through. However, the airflow velocity is low, and thus the sound quality of the speaker device 10 may not be affected. In one example, as illustrated in FIG. 11, the two serration portions 32 may not be spaced apart from each other, that is, the two serration portions 32 may be coupled together to form one serration portion 32, which is similar to the strip-shaped rib 31 of the first implementation.

According to the implementations, when using the terminal 100, the audio of the terminal 100 is output from the sound output port 11 of the speaker device 10. Since the sound output port 11 of the casing 1 is partially covered, the airflow velocity in the sound output port 11 of the casing 1 may be decreased, and the sound distortion and the doping noise can be improved, thereby providing a speaker device 10 and terminal 100 with high sound quality.

The modules or units of the implementations may be combined or split according to actual needs.

The above is implementations of the disclosure. It should be noted that those skilled in the art can also make some improvements and retouching without departing from the principles of the implementations of the disclosure. Those improvements and retouching should be considered as falling within the protection scope of the disclosure.

What is claimed is:

1. A speaker device, comprising:
   a casing defining a sound output port for outputting sound, the sound output port of the casing being partially covered, enabling a reduction in an airflow velocity in the sound output port; and
   an airflow cushion member disposed in the middle of the sound output port of the casing, wherein the airflow cushion member and the casing are integrally formed.

2. The speaker device of claim 1, wherein the sound output port has two opposite first edges and two opposite second edges, wherein the two first edges are parallel to a bottom of the casing and each of the two second edges is connected between the two first edges, wherein the sound output port has a middle area along an extension direction of the two first edges, wherein the middle area is covered and is located in the middle of the sound output port.

3. The speaker device of claim 2, wherein the airflow cushion member merely covers the middle area of the sound output port.

4. The speaker device of claim 1, wherein the airflow cushion member comprises at least one strip-shaped rib, wherein the at least one strip-shaped rib is connected across two first edges.

5. The speaker device of claim 4, wherein the at least one strip-shaped rib is embodied as one strip-shaped rib.

6. The speaker device of claim 4, wherein the at least one strip-shaped rib is embodied as a plurality of strip-shaped ribs, wherein the plurality of strip-shaped ribs are centrally disposed in a middle area of the sound output port, and adjacent strip-shaped ribs are spaced apart from each other.

7. The speaker device of claim 1, wherein the airflow cushion member comprises at least one serration portion, wherein the at least one serration portion is formed on both of two first edges of the sound output port or formed on one of the two first edges of the sound output port.

8. The speaker device of claim 7, wherein the at least one serration portion is embodied as two serration portions, wherein one of the two serration portions is formed on one of the two first edges of the sound output port, the other of the two serration portions is formed on the other of the two first edges of the sound output port, and the two serration portions face each other and are spaced apart from each other.

9. The speaker device of claim 7, wherein the at least one serration portion is embodied as two serration portions, wherein one of the two serration portions is formed on one of the two first edges of the sound output port, the other of the two serration portions is formed on the other of the two first edges of the sound output port, and the two serration portions are coupled together.

10. A terminal, comprising:
a speaker device comprising:
a casing defining a sound output port; and
an airflow cushion member, wherein the airflow cushion member and the casing are integrally formed;
the airflow cushion member being disposed in the middle of the sound output port of the casing to partially cover the sound output port of the casing, enabling a reduction in an airflow velocity in the sound output port.

11. The terminal of claim 10, wherein the sound output port has two opposite first edges and two opposite second edges, wherein the two first edges are parallel to a bottom of the casing and each of the two second edges is connected between the two first edges, wherein the sound output port has a middle area along an extension direction of the two first edges, wherein the middle area is covered and is located in the middle of the sound output port.

12. The terminal of claim 10, wherein the airflow cushion member comprises at least one strip-shaped rib, wherein the at least one strip-shaped rib is connected across two first edges.

13. The terminal of claim 12, wherein the at least one strip-shaped rib is embodied as one strip-shaped rib or a plurality of strip-shaped ribs, wherein the plurality of strip-shaped ribs are centrally disposed in a middle area of the sound output port, and adjacent strip-shaped ribs are spaced apart from each other.

14. A speaker device, comprising:
a casing defining a sound output port for outputting sound, the sound output port of the casing being partially covered, enabling a reduction in an airflow velocity in the sound output port; and
an airflow cushion member disposed in the middle of the sound output port of the casing, wherein the airflow cushion member is formed at a position of a housing directly facing the sound output port, wherein the housing is a front shell or a middle frame of a terminal, and the airflow cushion member comprises a strip-shaped rib protruding from the position of the housing aligned with the middle of the sound output port, wherein the housing is attached to the casing, and the strip-shaped rib on the housing is inserted in the middle of the sound output port or abuts against edges of the middle of the sound output port to partially cover the sound output port.

15. The speaker device of claim 14, wherein the sound output port has two opposite first edges and two opposite second edges, wherein the two first edges are parallel to a bottom of the casing and each of the two second edges is connected between the two first edges, wherein the sound output port has a middle area along an extension direction of the two first edges, wherein the middle area is covered and is located in the middle of the sound output port.

16. The speaker device of claim 15, wherein the airflow cushion member merely covers the middle area of the sound output port.

17. The speaker device of claim 14, wherein the strip-shaped rib is connected across two first edges.

18. The speaker device of claim 14, wherein the airflow cushion member comprises a plurality of strip-shaped ribs, wherein the plurality of strip-shaped ribs are centrally disposed in a middle area of the sound output port, and adjacent strip-shaped ribs are spaced apart from each other.

19. The speaker device of claim 14, wherein the airflow cushion member comprises at least one serration portion, wherein the at least one serration portion is formed on both of two first edges of the sound output port or formed on one of the two first edges of the sound output port.

20. The speaker device of claim 19, wherein the at least one serration portion is embodied as two serration portions, wherein one of the two serration portions is formed on one of the two first edges of the sound output port, the other of the two serration portions is formed on the other of the two first edges of the sound output port, and the two serration portions face each other and are spaced apart from each other.

* * * * *